US012696142B2

(12) United States Patent
Peng et al.

(10) Patent No.: US 12,696,142 B2
(45) Date of Patent: Jul. 28, 2026

(54) TRANSMISSION PROCESSING METHOD AND APPARATUS AND TERMINAL

(71) Applicant: VIVO MOBILE COMMUNICATION CO., LTD., Guangdong (CN)

(72) Inventors: Shuyan Peng, Guangdong (CN); Zichao Ji, Guangdong (CN); Siqi Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 403 days.

(21) Appl. No.: 18/090,576

(22) Filed: Dec. 29, 2022

(65) Prior Publication Data

US 2023/0217322 A1 Jul. 6, 2023

Related U.S. Application Data

(63) Continuation of application No. PCT/CN2021/103108, filed on Jun. 29, 2021.

(30) Foreign Application Priority Data

Jul. 1, 2020 (CN) .......................... 202010632774.1

(51) Int. Cl.
*H04W 36/00* (2009.01)

(52) U.S. Cl.
CPC ... *H04W 36/0022* (2013.01); *H04W 36/0058* (2018.08); *H04W 36/03* (2018.08)

(58) Field of Classification Search
CPC ......... H04W 36/0005; H04W 36/0011; H04W 36/0022; H04W 36/00222; H04W 36/0055; H04W 36/0058; H04W 36/0061; H04W 36/0066; H04W 36/0085; H04W 36/0088; H04W 36/0094; H04W 36/03;
(Continued)

(56) References Cited

U.S. PATENT DOCUMENTS

2015/0289153 A1* 10/2015 Gopal ............... H04W 36/0088
455/436
2016/0295502 A1 10/2016 Yoon et al.
(Continued)

FOREIGN PATENT DOCUMENTS

CN 107295669 A 10/2017
CN 107466484 A 12/2017
(Continued)

OTHER PUBLICATIONS

KP, How LTE Stuff Works?: 5G NR: Measurement GAPs, Online at https://howltestuffworks.blogspot.com/2020/01/5g-nr-measurement-gaps.html#:~:text=T ypical%20LTE%20gap%20length%20is,40% 20ms%20or%2080%20ms, 3GPP TS 38, Oct. 19, 2023, Gothenburg, Sweden.

*Primary Examiner* — Matthew W Genack
(74) *Attorney, Agent, or Firm* — Price Heneveld LLP

(57) ABSTRACT

This application provides a transmission processing method and apparatus and a terminal. The method includes: obtaining configuration information of a gap; and performing, based on the configuration information, at least one of the following within the gap: transmission based on a target radio technology, where the target radio technology is one of a first radio technology and a second radio technology; measurement on information of the target radio technology; and switching between the first radio technology and the second radio technology.

19 Claims, 4 Drawing Sheets

(58) Field of Classification Search
CPC ... H04W 36/24; H04W 36/30; H04W 36/302;
H04W 36/304
See application file for complete search history.

(56) References Cited

U.S. PATENT DOCUMENTS

| 2018/0054800 | A1* | 2/2018 | Yeo ..................... H04W 72/54 |
| 2019/0124651 | A1 | 4/2019 | Xu et al. |
| 2019/0150147 | A1 | 5/2019 | Lee et al. |
| 2019/0230619 | A1 | 7/2019 | Cui et al. |
| 2020/0029202 | A1* | 1/2020 | Baghel .................... H04W 8/24 |
| 2020/0084783 | A1 | 3/2020 | Li et al. |
| 2021/0120471 | A1 | 4/2021 | Choi et al. |
| 2021/0297971 | A1* | 9/2021 | Hosseini ........... H04W 56/0015 |
| 2023/0188282 | A1* | 6/2023 | Yum .................. H04L 25/0202 |
| | | | 370/329 |

FOREIGN PATENT DOCUMENTS

| CN | 108366379 | A | 8/2018 |
| CN | 110892754 | A | 3/2020 |
| EP | 3442286 | A1 | 2/2019 |

* cited by examiner

TRANSMISSION PROCESSING METHOD AND APPARATUS AND TERMINAL

CROSS-REFERENCE TO RELATED APPLICATIONS

This application is a continuation application of PCT International Application No. PCT/CN2021/103108 filed on Jun. 29, 2021, which claims priority to Chinese Patent Application No. 202010632774.1, filed on Jul. 1, 2020 in China, which are incorporated in their entireties by reference herein.

TECHNICAL FIELD

This application pertains to the field of communications technologies, and specifically relates to a transmission processing method and apparatus and a terminal.

BACKGROUND

A long term evolution (LTE) system supports sidelink (SL) transmission, that is, data transmission between terminals (User Equipment, UE) is directly performed on a physical layer. LTE sidelink communication is based on broadcast. Although LTE sidelink can be used to support basic security communication of vehicle to everything (V2X), LTE sidelink is not applicable to other more advanced V2X services. A 5th generation (5G) new radio (NR) system supports more advanced sidelink transmission designs, such as unicast, multicast, or groupcast, and therefore can support more comprehensive service types. In addition, to enable an SL to carry acknowledgement/negative acknowledgement (ACK/NACK) feedback information, NR V2X supports a new SL channel, that is, a PSFCH (Physical Sidelink Feedback Channel). A period of the PSFCH channel in time domain is N (N=0/1/2/4), where N can be understood as that every N (logical) slots include a PSFCH. N=0 indicates that no PSFCH is configured in a resource pool.

However, in the prior art, communication between a vehicle and UE having low processing capability, especially pedestrian user equipment (Pedestrian UE, PUE) cannot support simultaneous processing of Uu TX/RX (that is, downlink (DL) receiving and uplink (UL) sending) and TX/RX information (for example, PSFCH information or data information) on the SL, resulting that different information processing requirements cannot be met and the efficiency is reduced.

SUMMARY

According to a first aspect, an embodiment of this application provides a transmission processing method applied to a terminal, where the method includes:

obtaining configuration information of a gap; and performing, based on the configuration information, at least one of the following within the gap:

transmission based on a target radio technology, where the target radio technology is one of a first radio technology and a second radio technology;

measurement on information of the target radio technology; and switching between the first radio technology and the second radio technology.

According to a second aspect, an embodiment of this application provides a transmission processing apparatus, including:

an obtaining module, configured to obtain configuration information of a gap; and a processing module, configured to perform, based on the configuration information, at least one of the following within the gap:

transmission based on a target radio technology, where the target radio technology is one of a first radio technology and a second radio technology;

measurement on information of the target radio technology; and switching between the first radio technology and the second radio technology.

According to a third aspect, an embodiment of this application further provides a terminal, where the terminal includes a processor, a memory, and a program or instructions stored in the memory and capable of running on the processor, and when the program or instructions are executed by the processor, the steps of the method according to the first aspect are implemented.

According to a fourth aspect, an embodiment of this application further provides a readable storage medium, where the readable storage medium stores a program or instructions, and when the program or instructions are executed by a processor, the steps of the method according to the first aspect are implemented.

According to a fifth aspect, an embodiment of this application provides a chip, where the chip includes a processor and a communication interface, the communication interface is coupled to the processor, and the processor is configured to run a program or instructions to implement the method according to the first aspect.

According to a sixth aspect, a computer software product is provided, where the computer software product is stored in a non-volatile storage medium, and the software product is configured to be executed by at least one processor to implement the steps of the method according to the first aspect.

According to a seventh aspect, a terminal is provided, where the terminal is configured to perform the method according to the first aspect.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application without creative efforts shall fall within the protection scope of this application.

The terms "first", "second", and the like in this specification and claims of this application are used to distinguish between similar objects rather than to describe a specific order or sequence. It should be understood that data used in this way is used interchangeably in appropriate circumstances so that the embodiments of this application can be implemented in other orders than the order illustrated or described herein. In addition, in this specification and claims, "and/or" represents at least one of connected objects, and the symbol "/" generally represents an "or" relationship between the associated objects.

It should be noted that the technologies described in the embodiments of this application are not limited to long term evolution (LTE)/LTE-Advanced (LTE-A) systems, and may also be used in various wireless communication systems such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably. The technology described herein may be used in the above-mentioned systems and radio technologies as well as other systems and radio technologies. However, in the following descriptions, a new radio (NR) system is described for an illustration purpose, and NR terms are used in most of the following descriptions, although these technologies may also be applied to other applications than an NR system application, for example, 6th (6th Generation, 6G) communication systems.

Figure 1:
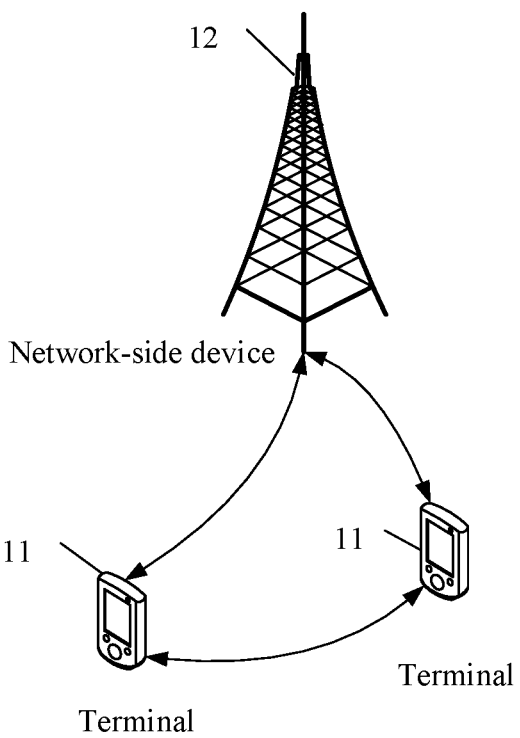
FIG. 1 is a block diagram of a wireless communication system.

FIG. 1 is a block diagram of a wireless communication system to which the embodiments of this application are applicable. The wireless communication system includes a terminal 11 and a network-side device 12. The terminal 11 may also be referred to as a terminal device or user equipment (UE). The terminal 11 may be a terminal-side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device, vehicle user equipment (VUE), or pedestrian user equipment (PUE). The wearable device includes a band, earphones, glasses, and the like. It should be noted that a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a Node B, an evolved Node B (eNB), a home NodeB, a home evolved NodeB, a wireless local area network (WLAN) access point, a wireless fidelity (Wi-Fi) node, a transmitting receiving point (TRP), or another appropriate term in the art. As long as the same technical effects are achieved, the base station is not limited to a specific technical term. It should be noted that only a base station in an NR system is used as an example in the embodiments of this application, but a specific type of the base station is not limited.

The following specifically describes the transmission processing method provided in the embodiments of this application through specific embodiments and application scenarios thereof with reference to the accompanying drawings.

Figure 2:
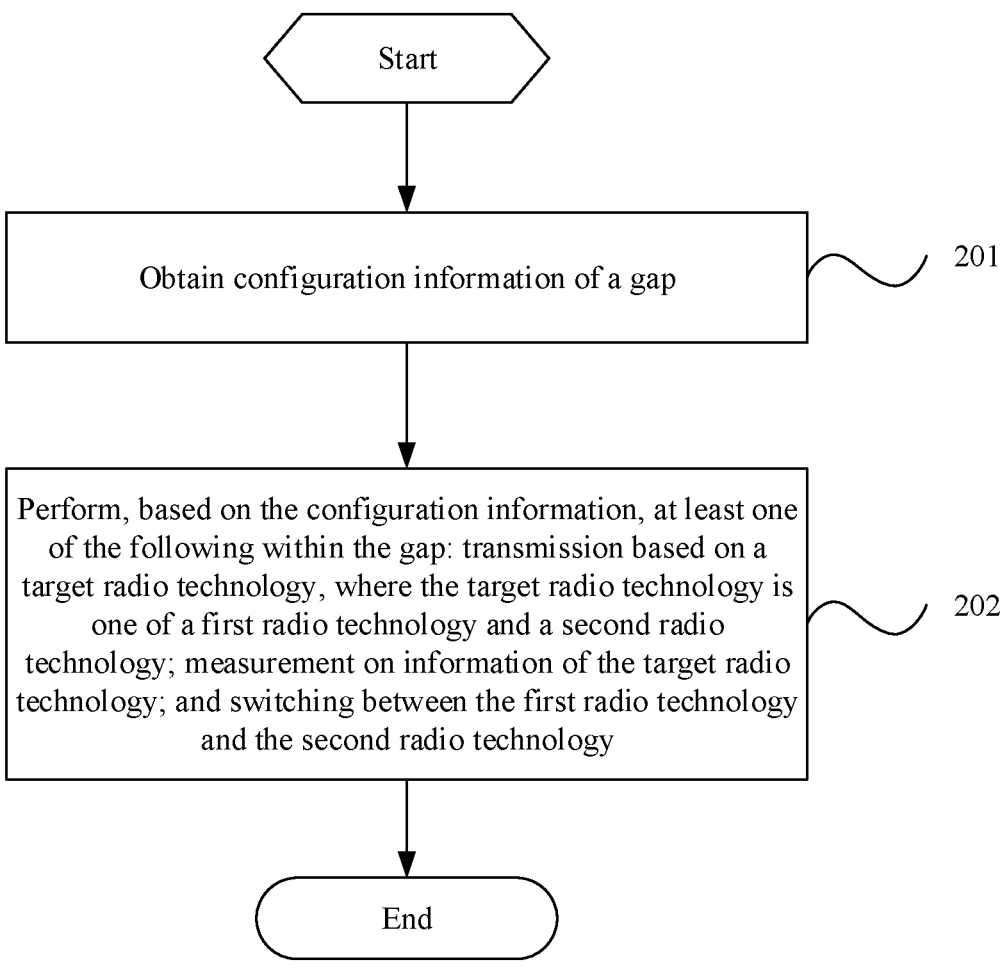
FIG. 2 is a schematic flowchart of a transmission processing method according to an embodiment of this application.

As shown in FIG. 2, a transmission processing method according to an embodiment of this application is applied to a terminal and includes the following steps.

Step 201. Obtain configuration information of a gap.

In this step, the configuration information is used to determine a position of the gap, and the terminal can perform subsequent processing based on the position of the gap by obtaining the configuration information of the gap.

Step 202. Perform, based on the configuration information, at least one of the following within the gap:

transmission based on a target radio technology, where the target radio technology is one of a first radio technology and a second radio technology;

measurement on information of the target radio technology; and switching between the first radio technology and the second radio technology.

Herein, the first radio technology and the second radio technology may correspond to different links. For example, the first radio technology corresponds to an SL, and the second radio technology corresponds to a DL or a UL. The first radio technology and the second radio technology may correspond to different air interfaces. For example, the first radio technology corresponds to a Uu interface, and the second radio technology corresponds to a PC5 interface. The first radio technology and the second radio technology may correspond to SLs of different radio access technologies (RAT). For example, the first radio technology corresponds to an LTE SL, so that the second radio technology corresponds to an NR SL. The first radio technology and the second radio technology may correspond to different SL channels. The SL channels include a physical sidelink broadcast channel (PSBCH), a PSFCH, a physical sidelink shared channel (PSSCH), and a physical sidelink control channel (PSCCH). The first radio technology and the second radio technology specifically correspond to two of such SL channels. The first radio technology and the second radio technology may correspond to different carriers. For example, the first radio technology corresponds to a carrier 1 which carries an NR DL or UL, and the second radio technology corresponds to a carrier 2 which carries an NR SL. The first radio technology and the second radio technology may alternatively correspond to different BWPs. Certainly, the first radio technology and the second radio technology are not limited to the foregoing implementations, which are not listed one by one herein.

In addition, the measurement on the information of the target radio technology herein also includes measurement on channels or reference signals in or the target radio technology.

Therefore, transmission based on the target radio technology may be transmission of one of the foregoing first radio technology and second radio technology.

The measurement on the information of the target radio technology may alternatively be measurement on information of one of the foregoing first radio technology and second radio technology. Specifically, SL information is measured within the gap; or in transmission of the SL information, if Uu interface information needs to be measured, the Uu interface information is measured within the gap. In this case, it is not required to receive the SL information within the gap.

The switching between the first radio technology and the second radio technology may be switching between air interfaces, for example, switching between the Uu interface and the PC5 interface, which may further specifically be switching between SL information sending or receiving and DL receiving or switching between SL information sending or receiving and UL sending; or may be switching between RATs, for example, switching between NR and LTE, which may further specifically be switching from an LTE SL to an NR SL or switching from an NR SL to an LTE SL; or may be switching between SL channels, for example, switching between two of the channels, which may further specifically be switching from a PSSCH to a PSFCH or switching from a PSFCH to a PSSCH or a PSCCH; or may be switching between frequencies, switching between bandwidth parts (BWP), or the like. The Uu interface is used for DL and/or UL transmission, and the PC5 interface is used for SL transmission.

In this way, in this step, after step 201, the terminal can perform, based on the configuration information, at least one of transmission based on the target radio technology, measurement on the information of the target radio technology, and switching between the first radio technology and the second radio technology within the gap.

In this way, in the method provided in this embodiment of this application, according to the foregoing step 201 and step 202, after the configuration information of the gap is obtained, at least one of transmission based on the target radio technology, measurement on the information of the target radio technology, and switching between the first radio technology and the second radio technology can be performed within the gap based on the configuration information, where the target radio technology is one of the first radio technology and the second radio technology. This can meet different information processing requirements, improve transmission efficiency, and implement interoperation between different air interfaces/RATs.

It can be learned from the foregoing content that the gap (GAP) in this embodiment may be configured on the Uu interface (or the UL and/or the DL) and used for receiving and/or sending the SL information, where certainly, it is not required to process the Uu interface information within the GAP; or may be configured on the SL and used for processing the Uu interface information, where certainly, it is not required to receive and/or send the SL information within the GAP; or may be configured on RAT 1 and used for processing of information of RAT 2, where certainly, it is not required to process information of the RAT 1 within the GAP; or may be configured on the RAT 2 and used for processing the information of the RAT 1, where it is not required to process the information of the RAT 1 within the GAP. The RAT 1 and RAT 2 are the same or different RATs.

For sending and/or receiving of first information, optionally, UE performs transmission through the Uu interface, and the UE can receive and/or send the SL information within the GAP, for example, PUE sends or receives PSFCH information, VUE sends or receives PSFCH, or PUE sends or receives the SL information; or UE performs transmission through an air interface 1, and the UE can receive and/or send data on an air interface 2 within the GAP. For measurement on second information, optionally, the measurement may be measurement on information or channels on PC5 or measurement on information or channels on Uu. In addition, in a case that UE is in the RAT 1, the UE can process the information of the RAT 2 within the GAP. Such processing includes at least one of sending, receiving, and measurement. Certainly, in a case that the information or channels on PC5 are measured within the GAP, it is not required to measure the information or channels on Uu within the GAP. Configuration of another GAP may be similar. Details are not described herein again.

For example, in a scenario in which PUE receives DL information, the PUE uses the method provided in this embodiment of this application. PUE 1 can receive, after obtaining configuration information of a gap, SL information within a gap for receiving DL information. Certainly, PUE 2 can also measure, after obtaining configuration information of the gap, the SL information in the gap for receiving DL information.

Optionally, the gap includes at least one of the following:

a duration for switching between downlink transmission and sidelink transmission;

a power adjustment duration for downlink transmission and sidelink transmission;

a duration for switching between uplink transmission and sidelink transmission;

a power adjustment duration for uplink transmission and sidelink transmission;

a gap duration for switching between frequencies;

a gap duration for switching between radio frequencies;

a gap duration for switching between bandwidth parts BWPs;

a gap duration for switching between air interfaces;

a power adjustment duration for air interfaces;

a gap duration for switching between radio access technologies RATs;

a power adjustment duration for RATs;

a gap duration for switching between channels; and a power adjustment duration for channels.

Transmission may be understood as sending, or receiving, or sending and receiving. Therefore, the duration for switching between downlink transmission and sidelink transmission may be a duration for switching between DL receiving and SL sending and/or receiving. A duration T for switching between DL receiving and SL sending and/or receiving may be a gap duration T1 for switching from DL receiving to SL sending or receiving, or may be a gap duration T2 for switching from SL sending or receiving to DL receiving. T1 and T2 may be the same or different. Likewise, this is also the case for the foregoing other switching durations, power adjustment durations, and gap durations for switching. Details are not listed one by one herein. In addition, in a case that a gap (GAP) includes a plurality of durations in the foregoing durations, the gap may be a sum of the plurality of durations or the maximum value in the plurality of durations.

Optionally, in this embodiment, the configuration information is used to configure at least one of the following:

a length of the gap;

a start position of the gap;

an end position of the gap;

an offset position of the gap;

timing advance information of the gap;

a period of the gap; and a configuration quantity of the gap.

In the configuration information, the period of the GAP is not necessarily enabled. In this embodiment, enabling may also be understood as activation, start, or indication.

Optionally, the configuration information is obtained by using at least one of the following manners:

pre-definition;

pre-configuration;

radio resource control (RRC) configuration;

medium access control control element (MAC CE) configuration;

downlink control information (DCI) indication; and sidelink control information (SCI) indication.

Therefore, at least one of the length, start position, end position, offset position, timing advance information, period, and configuration quantity of the gap may be obtained by using at least one of manners including pre-definition, pre-configuration, RRC configuration, MAC CE configuration, DCI indication, and SCI indication. Certainly, pre-definition, pre-configuration, RRC configuration, MAC CE configuration, DCI indication, and SCI indication may directly describe configuration information of a GAP, for example, a length of the GAP is M symbols, and a start position is slot 0; or may give association description on the configuration information of the GAP, for example, DCI indicates an offset position of the start position of the GAP with respect to DCI receiving, where a value of the offset position may be positive or negative, which is not limited herein.

Optionally, the length of the gap is associated with a subcarrier spacing (SCS) and/or capability of the terminal.

For example, a larger SCS leads to a greater length of the GAP. For configuration of the length of the GAP, lengths of the GAP under different SCSs may also be defined through at least one of pre-definition, pre-configuration, RRC configuration, MAC CE configuration, DCI indication, and SCI indication. For example, the lengths of the GAP under different SCSs are configured through RRC, and UE determines a length of the GAP with reference to a current SCS.

The length of the GAP may be associated with the capability of the terminal. The capability of the terminal may be capability of supporting SCS lengths by the terminal, capability of supporting frequency bands by the terminal, or the like. An SCS processing manner may be defined based on the foregoing manner. In a case that the terminal supports only FR1 (frequency range 1), a set of configuration information is used. In a case that the terminal supports FR2, another set of configuration information is used under the FR2. Corresponding configuration information is selected based on capability. A gap configured under the FR2 is shorter.

Optionally, the start position of the gap is associated with a position of a physical sidelink feedback channel PSFCH.

For example, the start position of the GAP is the same as the position of the PSFCH or is obtained by adding a position of an offset value to the position of the PSFCH. The offset value may be positive or negative, which is not limited herein. Certainly, the start position of the GAP in the configuration information is not necessarily a start position for enabling the GAP. The position of the offset value may be an offset position of the gap in the configuration information. Certainly, the offset value may alternatively be obtained by using at least one of manners including pre-definition, pre-configuration, RRC configuration, MAC CE configuration, DCI indication, and SCI indication.

Optionally, the end position of the gap is associated with a position of a PSFCH.

Like the start position of the GAP, the end position of the GAP is the same as the position of the PSFCH or is obtained by adding a position of an offset value to the position of the PSFCH. The offset value may be positive or negative, which is not limited herein. The position of the offset value may be an offset position of the gap in the configuration information. Certainly, the offset value may alternatively be obtained by using at least one of manners including pre-definition, pre-configuration, RRC configuration, MAC CE configuration, DCI indication, and SCI indication.

Optionally, the period of the gap is associated with a period of a PSFCH.

For example, the period of the GAP is equal to the period of the PSFCH or uses the period of the PSFCH as a reference. Herein, the period of the GAP refers to a time interval at which the GAP periodically appears in a Uu BWP or an SL resource pool. In different periods, values of lengths of the GAP may be the same or different. Certainly, the period of the GAP in the configuration information is not necessarily a period for enabling the GAP.

In this embodiment, optionally, the configuration information corresponds to at least one of the following information:

a transmission type;

a resource pool;

a terminal;

a terminal group; and a priority.

Herein, the priority may be a channel priority, a data packet priority, a logical channel priority, a physical layer priority, or a priority indicated by a higher layer.

In this way, the configuration information of the GAP may correspond to one of the transmission type, the resource pool, the terminal, the terminal group, and the priority. Certainly, a correspondence may be one-to-one, one-to-many, many-to-one, or many-to-many. For example, configuration information of the GAP is configured for unicast and groupcast, where unicast corresponds to configuration information 1, and groupcast corresponds to configuration information 2; or configuration information of the GAP is configured for different groupcast types, where a groupcast type 1 corresponds to configuration information 3, and a groupcast type 2 corresponds to configuration information 4.

Optionally, the configuration information is periodically sent or is triggered based on a first preset event.

In this way, UE can periodically report the configuration information to a network-side device or a control node, periodically receive the configuration information sent by the network-side device or the control node, or obtain the configuration information in a case that the first preset event occurs. The first preset event may be: in a case that the terminal performs Uu interface data transmission, there is data to be transmitted on the PC5 interface; in a case that the terminal performs PC5 interface data transmission, there is data to be transmitted on the Uu interface; there is downlink data to be transmitted on a network-side device or a control node; and a network-side device or a control node has configured a periodic uplink resource for the terminal, and there is uplink data transmission on the terminal. Certainly, the first preset event is not limited to the foregoing content. Details are not listed one by one herein.

In this way, in a case that when UE is sending or receiving Uu interface data (that is, receiving DL data and sending UL data), there is SL information to be sent or received, the UE can request for configuration of the GAP from the network-side device or the control node, or the UE can report the configuration information of the GAP to the network-side device or the control node. After the configuration information has been reported to the network-side device or the control node, the network-side device or the control node does not schedule UL or DL data within the GAP, and the UE sends information on the SL, thereby avoiding collision.

In a case that there is DL data transmission on the network-side device or the control node, the configuration information of the GAP is configured for the UE.

In a case that a periodic UL resource has been configured for the UE by the network-side device or the control node, when there is UL information transmission on the UE, the configuration information of the GAP is sent on the periodic UL resource configured. In this case, the configuration information of the GAP is configured by the network-side device. The periodic UL resource is small and is only used for sending the configuration information of the GAP. However, if there is UL data to be sent, the UE dynamically triggers enabling of the GAP. The network-side device receives the configuration information of the GAP, and receives the UL information of the UE within a corresponding GAP. In V2X, sharing may be implemented for a UL and an SL.

A period of the configuration information may be the same as or different from a period of the GAP. In addition, a periodic resource of the configuration information may be independently configured or associated with configuration of the GAP.

Optionally, the gap is enabled by using at least one of the following manners: being enabled based on triggering of a second preset event;

being enabled based on a period;

being enabled based on indication of first preset signaling;

in a case that a PSFCH is configured in a resource pool for the terminal, enabling a gap configured in the resource pool; and in a case that a PSFCH period in a resource pool for the terminal is non-zero, enabling a gap configured in the resource pool.

In this embodiment, enabling of the GAP means: within the GAP, sending and/or receiving first information, performing measurement on transmission of second information, and/or performing switching. For example, when UE is receiving data on a DL BWP or a UL BWP, if the GAP is enabled, the UE receives or sends data on an SL; when the UE is receiving or sending data on an SL, if the GAP is enabled, the UE receives data on a DL or sends data on a UL.

Herein, being enabled based on triggering of a second preset event means that in a case that the second preset event occurs, the GAP may be directly triggered, that is, the GAP is enabled.

In a case of being enabled based on a period, the period may be a period in configuration information; or in a case that the first preset event occurs, may be an enabling period T' corresponding to the first preset event and obtained by using at least one of manners including pre-definition, pre-configuration, RRC configuration, MAC CE configuration, DCI indication, and SCI indication. The GAP is enabled according to the enabling period T'. For example, a GAP is present every T' time intervals in a Uu BWP or an SL resource pool, and is used for receiving or sending data on Uu or SL. The enabling period may be the same as or different from a configuration period.

Being enabled based on indication of first preset signaling means that the GAP is enabled after the first preset signaling has been received. The indication of the first preset signaling may be explicit indication or implicit indication. For example, SCI indication is hybrid automatic repeat request (HARQ) enable. The SCI may be used as the first preset signaling for indicating enabling. Certainly, in a case that PSFCH receiving is performed within the GAP, an existing field in the SCI may also be used for GAP enabling indication, so as to reduce signaling overheads. Certainly, the first preset signaling may alternatively be triggered by a specific event, for example, a second preset event.

Optionally, the second preset event includes at least one of the following: in a case that the terminal performs Uu interface data transmission, there is data to be transmitted on the PC5 interface;

in a case that the terminal performs PC5 interface data transmission, there is data to be transmitted on the Uu interface;

there is downlink data to be transmitted on a network-side device or a control node; and a network-side device or a control node has configured a periodic uplink resource for the terminal, and there is uplink data transmission on the terminal.

Certainly, the second preset event includes but is not limited to the foregoing content. Details are not listed one by one herein.

Optionally, in a case of enabling the gap based on indication of the first preset signaling, the gap is enabled in a first duration after the first preset signaling is sent or received.

In a case that the first preset signaling is dynamic signaling, the first duration is a demodulation duration of the first preset signaling; or in a case that the first preset signaling is RRC signaling, the first duration is a corresponding duration in which a first timer meets a specific condition or expires. The specific condition may be a sending end of the RRC signaling having received acknowledgement (ACK) information from a receiving end, or other conditions configured or defined. Details are not listed one by one herein.

In this way, in a case of enabling the GAP based on indication of the first preset signaling, where the first preset signaling is dynamic signaling, the GAP is enabled after demodulation of the first preset signaling, meaning that a start position for enabling the GAP is at least on a next position corresponding to the receiving moment of the first preset signaling plus the first duration. For example, a GAP may be configured by RRC configuration at slot 0, slot 5, slot 10, and slot 15. If DCI indicates enabling a GAP at slot 8, and a DCI processing time (that is, the first duration) is 2 slots, meaning that DCI information can be demodulated or enabling signaling can be obtained in 2 slots, a GAP in slot 10 is enabled. If DCI indicates enabling a GAP in slot 9, and a DCI processing time is 2 slots, meaning that enabling signaling carried on the DCI can be demodulated at slot 10, a next GAP (that is, the gap in slot 15) is the first GAP enabled.

In addition, in this embodiment, an enabling quantity of the gap is N, where positions of N gaps are continuous or discontinuous.

Herein, the enabling quantity of the GAP may be obtained by using at least one of manners including pre-definition, pre-configuration, RRC configuration, MAC CE configuration, DCI indication, and SCI indication. Based on the enabling quantity N of the GAP, after the first GAP enabled, N−1 continuous or discontinuous GAPs can be enabled. Certainly, in a case that the enabling quantity N of the GAP is present, after a quantity of GAPs enabled is greater than N, the GAP is disabled.

The N gaps are N continuous gaps in gaps configured and are not required to be continuous in time domain. For example, a duration of each gap is 1 subframe (that is, 1 ms). In a case that subframe 5 (SF5), SF15, SF25, SF35, SF45, SF55, SF65, and SF75 are possible positions for configuration, if one piece of enabling signaling (first preset signaling) is received in subframe 24 and the enabling quantity configured is 3, SF25, SF35, and SF45 are positions for enabling a GAP, and UE perform related operations in these GAPs.

Optionally, the gap is disabled through indication of second preset signaling.

In other words, GAP disabling is indicated through the second preset signaling. The second preset signaling may be explicit indication or implicit indication. Details are not described herein. The first preset signaling and the second preset signaling may be the same or different.

Optionally, the first preset signaling includes at least one of the following:

RRC;

MAC CE;

DCI; and

SCI.

Optionally, the second preset signaling includes at least one of the following:

RRC;

MAC CE;

DCI; and

SCI.

In this embodiment, on one hand, enabling can be performed based on configuration information, that is, after configuration information of a GAP is obtained, the GAP is enabled based on the configuration information. For example, configuration information of a GAP is configured by RRC, and after a terminal obtains the configuration information of the GAP through RRC, the GAP is enabled based on the configuration information. On the other hand, a GAP is configured semi-persistently. On the basis of configuration information, the GAP is enabled based on triggering of the second preset event or the first preset signaling, reducing physical layer signaling overheads and improving efficiency and coverage. For example, configuration information of a GAP is configured by RRC; after a terminal obtains the configuration information of the GAP through RRC, DCI or SCI for indicating enabling is further received; and after enabling signaling is obtained through demodulation of the DCI or SCI, the GAP is enabled.

In this embodiment, it should be further known that units of parameters such as a length, a start position, an end position, an offset position, and a timing advance position corresponding to timing advance information of a GAP may be millisecond, second, slot, mini-slot, multi-slot, frame, subframe, or the like. In addition, the units of the parameters may be the same or different.

The following describes the application of the method provided in this embodiment of this application with reference to specific scenarios.

Scenario 1: For PUE, a length of an SL reception gap GAP (for example, the length is K slots) is pre-configured for the PUE through RRC. DCI is used for enabling the GAP. A start position for enabling the GAP is obtained according to a position of the DCI and an offset value indicated by the DCI.

The start position for enabling the GAP is obtained by adding a slot offset value indicated by the DCI to the position of the DCI. PUE performs at least one of switching from a DL to an SL, receiving of PSFCH information, and switching from an SL to a DL within the GAP.

Scenario 2: A pre-configured enabling period of a GAP is associated with a period of a PSFCH. In a case that a period of a PSFCH configured in a resource pool for PUE is configured to be a non-zero value, an enabling period of a GAP of the PUE is the period of the PSFCH. In a case that a period of a PSFCH configured in a resource pool for PUE is zero, no GAP is configured.

When PUE is receiving information on a receiving DL BWP, if SCI indication for scheduling data transmission on an SL is feedback-based data transmission, the PUE enables a GAP in a corresponding position, receives PSFCH information within the GAP, and reports related parameters (such as a length and a start position for enabling) of the GAP enabled to a base station. The base station sends no DL data to the PUE within the GAP.

Scenario 3: Configuration information of a GAP is configured through RRC under NR SL and the GAP is enabled based on the configuration information. In this case, UE can process information on an LTE SL within the GAP.

Certainly, in this embodiment, specific implementation is described by using transmission on an SL and a UL or a DL for example. However, a GAP can also be used for transmission on a backhaul link and a fronthaul link.

To sum up, according to the method provided in this embodiment of this application, after the configuration information of the gap is obtained, at least one of transmission based on the target radio technology, measurement on the information of the target radio technology, and switching between the first radio technology and the second radio technology can be performed within the gap based on the configuration information, where the target radio technology is one of the first radio technology and the second radio technology. This can meet different information processing requirements, improve transmission efficiency, and implement interoperation between different air interfaces/RATs.

It should be noted that the transmission processing method provided in this embodiment of this application may be performed by a transmission processing apparatus or a control module for performing or loading the transmission processing method in the transmission processing apparatus. This embodiment of this application describes the transmission processing method provided in this embodiment of this application by using an example in which the transmission processing apparatus performs or loads transmission processing method.

Figure 3:
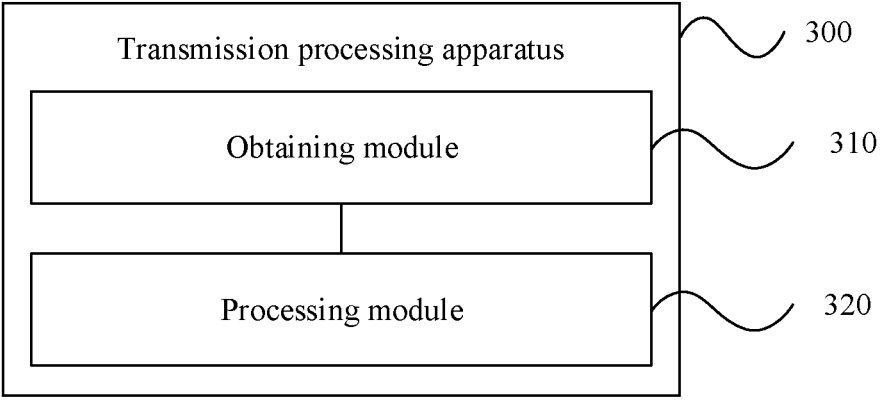
FIG. 3 is a schematic structural diagram of a transmission processing apparatus according to an embodiment of this application.

As shown in FIG. 3, a transmission processing apparatus 300 according to an embodiment of this application includes:

an obtaining module 310, configured to obtain configuration information of a gap; and a processing module 320, configured to perform, based on the configuration information, at least one of the following within the gap:

transmission based on a target radio technology, where the target radio technology is one of a first radio technology and a second radio technology;

measurement on information of the target radio technology; and switching between the first radio technology and the second radio technology.

Optionally, the gap includes at least one of the following:

a duration for switching between downlink transmission and sidelink transmission;

a power adjustment duration for downlink transmission and sidelink transmission;

a duration for switching between uplink transmission and sidelink transmission;

a power adjustment duration for uplink transmission and sidelink transmission;

a gap duration for switching between frequencies;

a gap duration for switching between radio frequencies;

a gap duration for switching between bandwidth parts BWPs;

a gap duration for switching between air interfaces;

a power adjustment duration for air interfaces;

a gap duration for switching between radio access technologies RATs;

a power adjustment duration for RATs;

a gap duration for switching between channels; and a power adjustment duration for channels.

Optionally, the first configuration information is used to configure at least one of the following:

a length of the gap;

a start position of the gap;

an end position of the gap;

an offset position of the gap;

timing advance information of the gap;

a period of the gap; and a configuration quantity of the gap.

Optionally, the length of the gap is associated with a subcarrier spacing SCS and/or capability of a terminal.

Optionally, the start position of the gap is associated with a position of a physical sidelink feedback channel PSFCH.

Optionally, the end position of the gap is associated with a position of a PSFCH.

Optionally, the configuration information is obtained by using at least one of the following manners:

pre-definition;

pre-configuration;

radio resource control RRC configuration;

medium access control control element MAC CE configuration;

downlink control information DCI indication; and sidelink control information SCI indication.

Optionally, the configuration information is periodically sent or is triggered based on a first preset event.

Optionally, the configuration information corresponds to at least one of the following information:

a transmission type;

a resource pool;

a terminal;

a terminal group; and a priority.

Specifically, the gap is enabled by using at least one of the following manners:

being enabled based on triggering of a second preset event;

being enabled based on a period;

being enabled based on indication of first preset signaling;

in a case that a PSFCH is configured in a resource pool for the terminal, enabling a gap configured in the resource pool; and in a case that a PSFCH period in a resource pool for the terminal is non-zero, enabling a gap configured in the resource pool.

Optionally, the second preset event includes at least one of the following:

in a case that the terminal performs Uu interface data transmission, there is data to be transmitted on the PC5 interface;

in a case that the terminal performs PC5 interface data transmission, there is data to be transmitted on the Uu interface;

there is downlink data to be transmitted on a network-side device or a control node; and a network-side device or a control node has configured a periodic uplink resource for the terminal, and there is uplink data transmission on the terminal.

Optionally, in a case of enabling the gap based on indication of the first preset signaling, the gap is enabled in a first duration after the first preset signaling is sent or received.

Optionally, an enabling quantity of the gap is N, and positions of N gaps are continuous or discontinuous.

Optionally, the gap is disabled through indication of second preset signaling.

Optionally, the first preset signaling includes at least one of the following:

RRC;

MAC CE;

DCI; and

SCI.

Optionally, the second preset signaling includes at least one of the following:

RRC;

MAC CE;

DCI; and

SCI.

After obtaining the configuration information of the gap, the apparatus can perform, based on the configuration information, at least one of transmission based on the target radio technology, measurement on the information of the target radio technology, and switching between the first radio technology and the second radio technology within the gap, where the target radio technology is one of the first radio technology and the second radio technology. This can meet different information processing requirements, improve transmission efficiency, and implement interoperation between different air interfaces/RATs.

The transmission processing apparatus in this embodiment of this application may be an apparatus or a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, a vehicle-mounted electronic device, a wearable device, an ultra-mobile personal computer (UMPC), a netbook, or a personal digital assistant (PDA), and the non-mobile electronic device may be a server, a network attached storage (NAS), a personal computer (PC), a television (TV), a teller machine, a self-service machine, or the like. This is not specifically limited in the embodiments of this application.

The transmission processing apparatus in this embodiment of this application may be an apparatus having an operating system. The operating system may be an Android operating system, may be an iOS operating system, or may be another possible operating system. This is not specifically limited in the embodiments of the present invention.

The transmission processing apparatus in this embodiment of this application can implement the processes implemented by the terminal in the method embodiment in FIG. 2. To avoid repetition, details are not described herein again.

Figure 4:
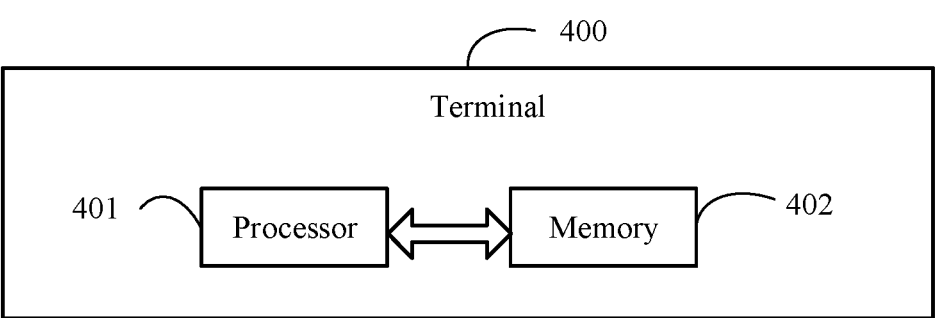
FIG. 4 is a schematic structural diagram of a terminal according to an embodiment of this application.

Optionally, as shown in FIG. 4, an embodiment of this application further provides a terminal 400, including a processor 401, a memory 402, and a program or instructions stored in the memory 402 and capable of running on the processor 401. When the program or instructions are executed by the processor 401, processes of the foregoing transmission method embodiment can be implemented, with the same technical effects achieved.

Figure 5:
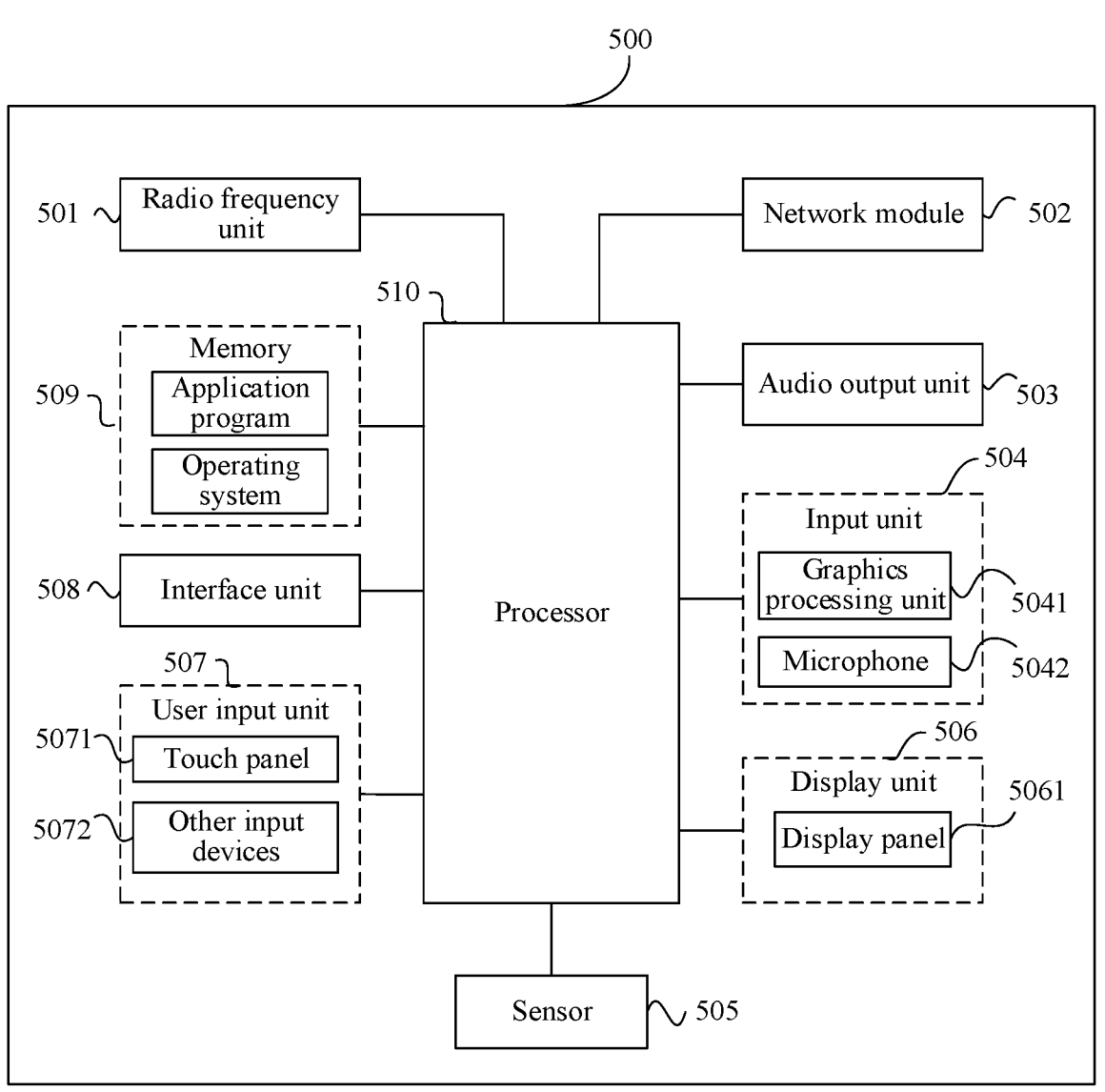
FIG. 5 is a schematic structural diagram of a terminal according to another embodiment of this application.

FIG. 5 is a schematic diagram of a hardware structure of a terminal for implementing the embodiments of this application.

The terminal 500 includes but is not limited to components such as a radio frequency unit 501, a network module 502, an audio output unit 503, an input unit 504, a sensor 505, a display unit 506, a user input unit 507, an interface unit 508, a memory 509, and a processor 510.

Persons skilled in the art can understand that the terminal 500 may further include a power supply (such as a battery) for supplying power to the components. The power supply may be logically connected to the processor 510 through a power management system. In this way, functions such as charge management, discharge management, and power consumption management are implemented using the power management system. The structure of the terminal shown in FIG. 5 does not constitute a limitation on the terminal. The terminal may include more or fewer components than shown in the figure, or a combination of some components, or components disposed differently. Details are not described herein.

It should be understood that, in this embodiment of this application, the input unit 504 may include a graphics processing unit (GPU) 5041 and a microphone 5042. The graphics processing unit 5041 processes image data of a static picture or a video that is obtained by an image capture apparatus (for example, a camera) in a video capture mode or an image capture mode. The display unit 506 may include the display panel 5061. The display panel 5061 may be configured in a form of a liquid crystal display, an organic light-emitting diode, or the like. The user input unit 507 includes a touch panel 5071 and other input devices 5072. The touch panel 5071 is also referred to as a touchscreen. The touch panel 5071 may include two parts: a touch detection apparatus and a touch controller. The other input devices 5072 may include but are not limited to a physical keyboard, a functional button (such as a volume control button or a power on/off button), a trackball, a mouse, and a joystick. Details are not described herein.

In this embodiment of this application, the radio frequency unit 501 sends downlink information received from a network-side device to the processor 510 for processing, and in addition, sends uplink data to the network-side device. Generally, the radio frequency unit 501 includes but is not limited to an antenna, at least one amplifier, a transceiver, a coupler, a low noise amplifier, and a duplexer.

The memory 509 may be configured to store software programs or instructions and various data. The memory 509 may mainly include a program or instruction storage area and a data storage area. The program or instruction storage area may store an operating system, an application program or instructions required by at least one function (for example, an audio playing function and an image playing function), and the like. In addition, the memory 509 may include a high-speed random access memory, and may further include a non-volatile memory, where the non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one magnetic disk storage device, a flash storage device, or another volatile solid-state storage device.

The processor 510 may include one or more processing units. Optionally, the processor 510 may integrate an application processor and a modem processor. The application processor mainly processes an operating system, a user interface, an application program or instructions, and the like. The modem processor mainly processes wireless communication, for example, a baseband processor. It should be understood that the modem processor may alternatively not be integrated into the processor 510.

The processor 510 is configured to: obtain configuration information of a gap; and performing, based on the configuration information, at least one of the following within the gap:

transmission based on a target radio technology, where the target radio technology is one of a first radio technology and a second radio technology;

measurement on information of the target radio technology; and switching between the first radio technology and the second radio technology.

After obtaining the configuration information of the gap, the terminal can perform, based on the configuration information, at least one of transmission based on the target radio technology, measurement on the information of the target radio technology, and switching between the first radio technology and the second radio technology within the gap, where the target radio technology is one of the first radio technology and the second radio technology. This can meet different information processing requirements, improve transmission efficiency, and implement interoperation between different air interfaces/RATs.

An embodiment of this application further provides a readable storage medium, where the readable storage medium stores a program or instructions, and when the program or instructions are executed by a processor, the processes of the foregoing transmission processing method embodiment are implemented, with the same technical effects achieved. To avoid repetition, details are not described herein again.

The processor is the processor in the terminal in the foregoing embodiment. The readable storage medium includes a computer-readable storage medium such as a computer read-only memory (ROM), a random access memory (RAM), a magnetic disk, or an optical disc.

An embodiment of this application further provides a chip, where the chip includes a processor and a communication interface, the communication interface is coupled to the processor, and the processor is configured to run a program or instructions to implement the processes of the foregoing transmission processing method embodiment, with the same technical effects achieved. To avoid repetition, details are not described herein again.

It should be understood that the chip mentioned in this embodiment of this application may also be referred to as a system-level chip, a system chip, a chip system, a system-on-chip, or the like.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In the absence of more restrictions, an element defined by "including a . . . " does not exclude another same element in a process, method, article, or apparatus that includes the element. In addition, it should be noted that the scopes of the method and apparatus in the implementations of this application are not limited to performing functions in the sequence shown or discussed, and may further include performing functions at substantially the same time or in a reverse sequence according to the involved functions. For example, the described method may be performed in a sequence different from the described sequence, and steps may be added, omitted, or combined. In addition, features described with reference to some examples may be combined in other examples.

By means of the foregoing description of the implementations, persons skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of this application essentially, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of this application.

It can be understood that the embodiments described in the embodiments of this disclosure may be implemented by hardware, software, firmware, middleware, microcode, or a combination thereof. For implementation with hardware, modules, units, and subunits may be implemented in one or more application specific integrated circuits (ASIC), a digital signal processor (DSP), a digital signal processing device (DSP Device, DSPD), a programmable logic device (PLD), a field-programmable gate array (FPGA), a general-purpose processor, a controller, a microcontroller, a microprocessor, another electronic unit for implementing the functions described in this disclosure, or a combination thereof.

For software implementation, the techniques described in the embodiments of this disclosure may be implemented by modules (for example, procedures or functions) that implement the functions described in the embodiments of this disclosure. Software code may be stored in the memory and executed by the processor. The memory may be implemented in or outside the processor.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A transmission processing method, performed by a terminal and comprising:
  obtaining configuration information of a gap; and
  performing, based on the configuration information, at least one of the following within the gap:
  measurement on information of a first radio technology if a transmission is performed based on a second radio technology; or measurement on information of a second radio technology if a transmission is performed based on a first radio technology; or,
  switching between the first radio technology and the second radio technology;
  wherein the first radio technology and the second radio technology correspond to sidelinks of different radio access technologies, respectively;
  the configuration information is used to configure a start position of the gap;
  the start position of the gap, which is used for inter-RAT measurement, is associated with a position of a physical sidelink feedback channel (PSFCH).

2. The method according to claim 1, wherein the gap comprises at least one of the following:
  a duration for switching between downlink transmission and sidelink transmission;

a power adjustment duration for downlink transmission and sidelink transmission;
  a duration for switching between uplink transmission and sidelink transmission;
  a power adjustment duration for uplink transmission and sidelink transmission;
  a gap duration for switching between frequencies;
  a gap duration for switching between radio frequencies;
  a gap duration for switching between bandwidth parts (BWPs);
  a gap duration for switching between air interfaces;
  a power adjustment duration for air interfaces;
  a gap duration for switching between radio access technologies (RATs);
  a power adjustment duration for RATs;
  a gap duration for switching between channels; or,
  a power adjustment duration for channels.

3. The method according to claim 1, wherein the configuration information is further used to configure at least one of the following:
  a length of the gap;
  an end position of the gap;
  an offset position of the gap;
  timing advance information of the gap;
  a period of the gap; or,
  a configuration quantity of the gap.

4. The method according to claim 3, wherein the length of the gap is associated with a subcarrier spacing (SCS) and/or capability of the terminal.

5. The method according to claim 3, wherein the end position of the gap is associated with a position of a PSFCH.

6. The method according to claim 1, wherein the configuration information is obtained by using at least one of the following manners:
  pre-definition;
  pre-configuration;
  radio resource control (RRC) configuration;
  medium access control control element (MAC CE) configuration;
  downlink control information (DCI) indication; or,
  sidelink control information (SCI) indication.

7. The method according to claim 1, wherein the configuration information is periodically sent or is triggered based on a first preset event.

8. The method according to claim 1, wherein the configuration information corresponds to at least one of the following information:
  a transmission type;
  a resource pool;
  a terminal;
  a terminal group; or,
  a priority.

9. The method according to claim 1, wherein the gap is enabled by using at least one of the following manners:
  being enabled based on triggering of a second preset event;
  being enabled based on a period;
  being enabled based on indication of first preset signaling;
  in a case that a PSFCH is configured in a resource pool for the terminal, enabling a gap configured in the resource pool; or,
  in a case that a PSFCH period in a resource pool for the terminal is non-zero, enabling a gap configured in the resource pool.

10. The method according to claim 9, wherein the second preset event comprises at least one of the following:

in a case that the terminal performs Uu interface data transmission, there is data to be transmitted on the PC5 interface;

in a case that the terminal performs PC5 interface data transmission, there is data to be transmitted on the Uu interface;

there is downlink data to be transmitted on a network-side device or a control node; or, a network-side device or a control node has configured a periodic uplink resource for the terminal, and there is uplink data transmission on the terminal.

11. The method according to claim 10, wherein in a case of enabling the gap based on indication of the first preset signaling, the gap is enabled in a first duration after the first preset signaling is sent or received.

12. The method according to claim 1, wherein an enabling quantity of the gap is N, and positions of N gaps are continuous or discontinuous.

13. The method according to claim 1, wherein the gap is disabled through indication of second preset signaling.

14. The method according to claim 10, wherein the first preset signaling comprises at least one of the following:

RRC;

MAC CE;

DCI; or,

SCI.

15. The method according to claim 13, wherein the second preset signaling comprises at least one of the following:

RRC;

MAC CE;

DCI; or,

SCI.

16. A terminal, comprising a processor, a memory, and a program or instructions stored in the memory and capable of running on the processor, wherein when the program or instructions are executed by the processor, the following steps are implemented:

obtaining configuration information of a gap; and performing, based on the configuration information, at least one of the following within the gap:

measurement on information of a first radio technology if a transmission is performed based on a second radio technology; or measurement on information of a second radio technology if a transmission is performed based on a first radio technology; or, switching between the first radio technology and the second radio technology;

wherein the first radio technology and the second radio technology correspond to sidelinks of different radio access technologies, respectively;

the configuration information is used to configure a start position of the gap;

the start position of the gap, which is used for inter-RAT measurement, is associated with a position of a physical sidelink feedback channel (PSFCH).

17. The terminal according to claim 16, wherein the gap comprises at least one of the following:

a duration for switching between downlink transmission and sidelink transmission;

a power adjustment duration for downlink transmission and sidelink transmission;

a duration for switching between uplink transmission and sidelink transmission;

a power adjustment duration for uplink transmission and sidelink transmission;

a gap duration for switching between frequencies;

a gap duration for switching between radio frequencies;

a gap duration for switching between bandwidth parts (BWPs);

a gap duration for switching between air interfaces;

a power adjustment duration for air interfaces;

a gap duration for switching between radio access technologies (RATs);

a power adjustment duration for RATs;

a gap duration for switching between channels; or, a power adjustment duration for channels.

18. The terminal according to claim 16, wherein the configuration information is further used to configure at least one of the following:

a length of the gap;

an end position of the gap;

an offset position of the gap;

timing advance information of the gap;

a period of the gap; or, a configuration quantity of the gap.

19. A non-transitory readable storage medium, wherein the non-transitory readable storage medium stores a program or instructions, and when the program or instructions are executed by a processor, the following steps are implemented:

obtaining configuration information of a gap; and performing, based on the configuration information, at least one of the following within the gap:

measurement on information of a first radio technology if a transmission is performed based on a second radio technology; or measurement on information of a second radio technology if a transmission is performed based on a first radio technology; or, switching between the first radio technology and the second radio technology;

wherein the first radio technology and the second radio technology correspond to sidelinks of different radio access technologies, respectively;

the configuration information is used to configure a start position of the gap;

the start position of the gap, which is used for inter-RAT measurement, is associated with a position of a physical sidelink feedback channel (PSFCH).

* * * * *